United States Patent
Lee

(10) Patent No.: US 9,519,402 B2
(45) Date of Patent: Dec. 13, 2016

(54) SCREEN DISPLAY METHOD IN MOBILE TERMINAL AND MOBILE TERMINAL USING THE METHOD

(71) Applicant: Samsung Electronics Co., Ltd., Gyeonggi-do (KR)

(72) Inventor: Seung-Myung Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 296 days.

(21) Appl. No.: 14/078,988

(22) Filed: Nov. 13, 2013

(65) Prior Publication Data

US 2014/0143725 A1   May 22, 2014

(30) Foreign Application Priority Data

Nov. 19, 2012   (KR) .................. 10-2012-0131171

(51) Int. Cl.
| | |
|---|---|
| *G06F 3/048* | (2013.01) |
| *G06F 3/0482* | (2013.01) |
| *G06F 17/30* | (2006.01) |
| *G11B 27/34* | (2006.01) |
| *G11B 27/10* | (2006.01) |
| *G06F 3/0481* | (2013.01) |
| *G06F 3/0483* | (2013.01) |

(52) U.S. Cl.
CPC .......... *G06F 3/0482* (2013.01); *G06F 3/0483* (2013.01); *G06F 3/04815* (2013.01); *G06F 17/30017* (2013.01); *G11B 27/105* (2013.01); *G11B 27/34* (2013.01); *G06F 2203/04802* (2013.01)

(58) Field of Classification Search
None
See application file for complete search history.

(56) References Cited

U.S. PATENT DOCUMENTS

| | | | | |
|---|---|---|---|---|
| 2008/0062141 | A1* | 3/2008 | Chandhri | G06F 3/0482 345/173 |
| 2008/0122796 | A1* | 5/2008 | Jobs | G06F 3/0488 345/173 |
| 2008/0155473 | A1* | 6/2008 | Duhig | G06F 3/0482 715/818 |
| 2008/0307364 | A1* | 12/2008 | Chaudhri | G06F 3/0483 715/836 |
| 2014/0149918 | A1* | 5/2014 | Asokan | G06Q 30/0255 715/783 |

FOREIGN PATENT DOCUMENTS

| | | |
|---|---|---|
| KR | 10-2009-0040462 A | 4/2009 |
| KR | 10-0950831 B1 | 3/2010 |

* cited by examiner

*Primary Examiner* — William Trapanese
(74) *Attorney, Agent, or Firm* — Cha & Reiter, LLC

(57) ABSTRACT

A screen display method by which to configure a screen in which media objects are moved according to navigational inputs in order to easily browse for a desired media object from among a plurality of media objects. The screen display method in a mobile terminal includes displaying media objects to be piled up at first and second positions and media objects to be arranged along a course that connects the first and second positions; and displaying the piled-up media objects at one of the first and second positions to be sequentially moved along the course toward the other of the first and second positions when an input event occurs.

34 Claims, 7 Drawing Sheets

SCREEN DISPLAY METHOD IN MOBILE TERMINAL AND MOBILE TERMINAL USING THE METHOD

CLAIM OF PRIORITY

This application claims the benefit under 35 U.S.C. §119(a) from a Korean Patent Application filed in the Korean Intellectual Property Office on Nov. 19, 2012, and assigned Serial No. 10-2012-0131171, the entire disclosure of which is incorporated herein by reference in its entirety.

BACKGROUND

Field

The present disclosure relates generally to a screen display method in a mobile terminal. More particularly, the present disclosure relates to a screen display method in a mobile terminal and the mobile terminal by which to configure a screen in which media objects are moving according to navigational inputs through a user interface implemented by a touchscreen.

Description of the Related Art

Typically, mobile terminals including but not limited to cell phones, smartphones, or tablet PCs, have touchscreens that provides a single display device. Compared with desktop computers, the mobile terminal has the display device with a relatively small display screen and has input constraints. However, with the gradual expansion of functionality of mobile terminals, more diverse interfaces and associated functions are required.

If a user accesses a music function in the desktop computer, the user may move the display upwardly or downwardly along an album list using a page-up button or page-down button of the keyboard. Using a mouse instead of the keyboard, the user may move in different directions along the album list by scrolling a scroll bar on the side of the screen with the mouse cursor. Also, the user may move to the top of the album list by selecting a 'top' button represented in a text form or an icon form under the album list.

The mobile terminal displays album jacket images, thumbnails and the like that correspond to medias such as music files, photos, videos, and the like on the screen to identify the medias. Typically, the user has to check through a very long album list to select a particular song. However, with an increase of the mobile terminal's storage capacity, the number of medias contained in the mobile terminal increases as well. Thus, the user may have to navigate enormous amounts of items in the album list to select the particular song.

However, since the mobile terminal is manufactured in a portable size, there are many constraints on the display and user interfacing. Thus, the user may suffer from dissatisfaction by searching through numerous music files, photos, video files, and the like in the mobile terminal to find an item of interest, as it is far more cumbersome than searching on a desk top due in part to the smaller screen of the mobile terminal and lack of a pointing device such as a mouse or trackball.

For example, if the user wishes to find an album stored in a music folder of the mobile terminal, he/she has to press a directional key button or make a touch input to find the album; however, if there is a large number of albums in the mobile terminal, the user needs to make many repetitive inputs to find the album and, in this case, may experience inconvenience because the user may not know where the album is among the listing of albums. Furthermore, as conventional mobile terminals only display stereotypical album images, they have limits in providing convenience to users and arousing interest of users.

SUMMARY

The present invention provides a screen display method and apparatus to increase visual recognizability of media objects in a mobile terminal.

The present invention also provides a screen display method and apparatus to enable a plurality of media objects to be more easily found than heretofore.

The present invention further provides a screen display method and apparatus to display media objects using a three dimensional computer graphics user interface.

The above and other objectives of the present invention may be achieved with the following configurations.

In accordance with an exemplary aspect of the present invention, provided is a screen display method in a mobile terminal, the method including: displaying media objects piled up at first and second end positions, and displaying media objects arranged along a course that connects the first and second end positions; and displaying the piled-up media objects at one of the first and second end positions sequentially in accordance with movement along the course toward the other of the first and second end positions when an input event occurs.

In accordance with another exemplary aspect of the present invention, provided is a mobile terminal for displaying a screen, the mobile terminal including: a touchscreen for display by sensing an input event that occurs by a touch; a storage for storing a plurality of media objects; and a controller for, upon a screen display request, displaying media objects to be piled up at first and second end positions and media objects to be arranged along a course that connects the first and second end positions; and displaying the piled-up media objects at one of the first and second end positions for sequential movement along the course toward the other of the first and second end positions when an input event occurs through the touchscreen.

A screen display method in a mobile terminal also includes displaying a plurality of media objects to be piled up respectively at first or second end positions and in which some of the plurality of media objects are arranged along a course while moving between the first and second end positions; and displaying the piled-up media objects as they are sequentially moved from one of the first and second end positions along the course toward the other of the first and second end positions when an input event occurs.

According to an aspect of the invention, the media objects arranged along the course while sequentially moving between the first and second end positions are displayed with a sense of perspective by reducing clarity of the media objects when arranged further from the center of the course.

According to yet another aspect of the present invention, displaying any one of the media objects arranged along the course as they sequentially move into the middle area of the screen between the first and second end positions comprises determining whether a media object of the plurality of media objects is selected from among the media objects arranged along the course; and expanding a size and displaying the media object in the middle area of the screen between the first and second end positions differently after the media object is selected.

BRIEF DESCRIPTION OF THE DRAWINGS

The above and other exemplary features and advantages of the present invention will become more apparent to a person of ordinary skill in the art by describing in detail exemplary embodiments thereof with reference to the attached drawings in which.

DETAILED DESCRIPTION

Figure 1:
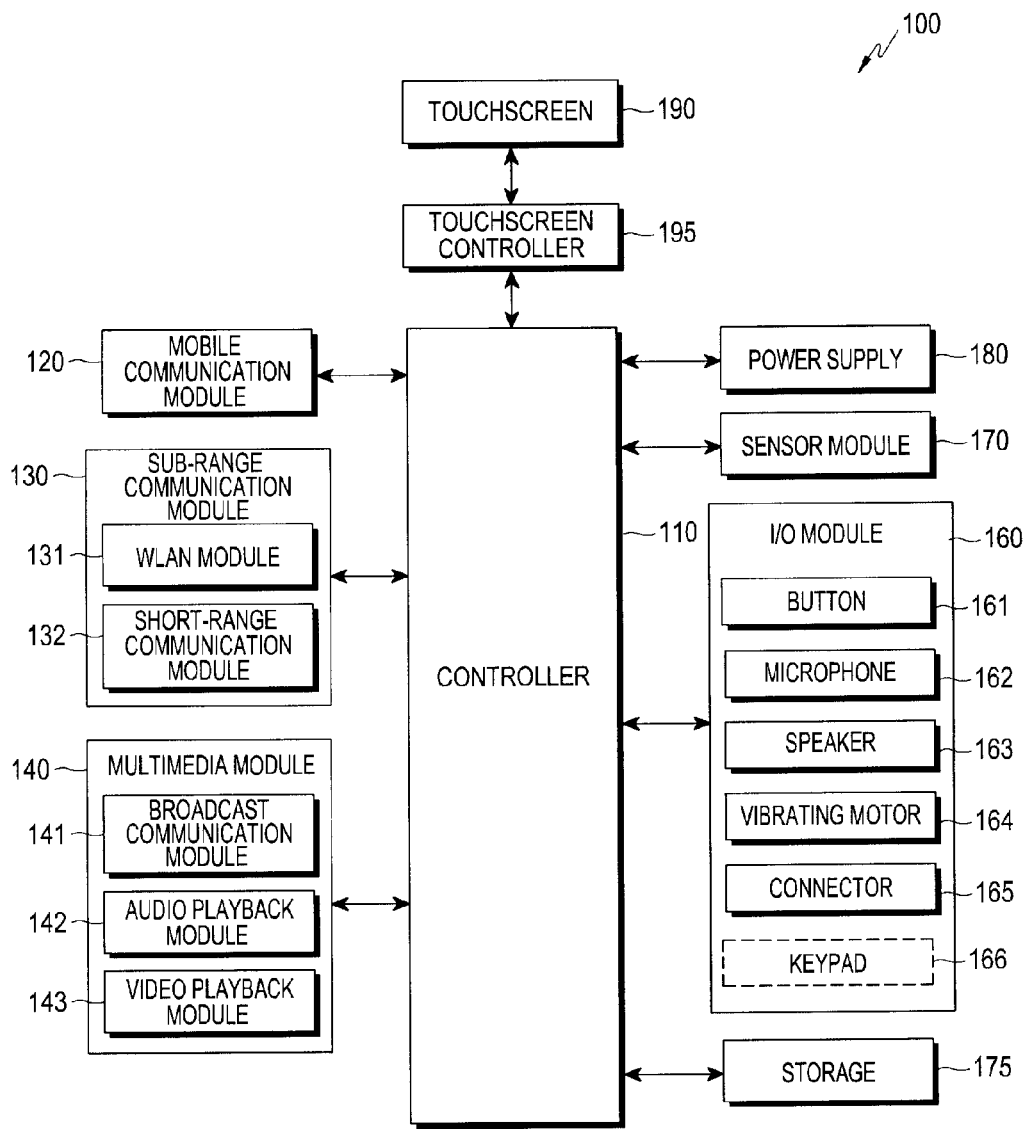
FIG. 1 is a block diagram of a mobile terminal, according to an exemplary embodiment of the present invention.

Reference will now be made in detail to the exemplary embodiments, examples of which are illustrated in the accompanying drawings, wherein like reference numerals refer to the like elements throughout. In the description of the present invention, a detailed description of commonly-used technologies or structures related to the invention may be omitted when it is deemed that such inclusion could unnecessarily obscure appreciation of the subject matter of the invention by a person of ordinary skill in the art.

The present invention provides a screen display method by which to configure a screen in which media objects are shifting according to navigational inputs in order to easily browse a desired media object among the plurality of media objects. The method includes the shifting of media objects in a navigational direction, in particular, displaying a plurality of media objects to be piled up at both ends of a three dimensional (3D) computer graphics user interface while displaying a media object substantially in the center; displaying some of the medial objects to be distributed on a curved course that connects the both ends; and displaying media objects to be sequentially moved from one end of the curved course toward the other end along the curved course in the navigational direction. The method advantageously provides benefits of easily identifying enormous amounts of media objects at a glance and increasing visual recognizability by representing movement of media objects using the 3D computer graphics user interface.

Prior to beginning a detailed discussion of the present invention, the media object is defined according to the following: The media object may be associated with a music file that may be visually represented, an album file having a plurality of music files into a group, a photo file, a video file, and the like. In an exemplary embodiment where the media object is associated with the album file, the media object may be provided as an album jacket image and displayed with a disc object in the disc form to enable reproduction of songs of the album file.

Operations and constituent components of the mobile terminal in which the method is implemented will now be described in connection with FIG. 1. Herein, the mobile terminal may include but is not limited to a smartphone, a cell phone, a tablet, a phablet, a personal computer (PC), a digital camera, an MP3 player, a game console, a display device, or any other device which supports storage and view of a plurality of media objects.

Referring now to FIG. 1, the mobile terminal 100 can be communicatively coupled to an external device (not shown) via a mobile communication module 120, a sub-communication module 130, and a connector 165. The "external device" can include but is not limited to another device, a cell phone, a smart phone, a tablet personal computer (PC), and a server, all of which are not shown.

In FIG. 1, the mobile terminal 100 includes a touch screen 190 and a touch screen controller 195. An artisan should understand and appreciate that a touchscreen is an example of an input unit, and the input unit is not required to be a touchscreen, and can be, for example any type of device for inputting a command. The mobile terminal 100 also includes a controller 110, the mobile communication module 120, the sub-communication module 130, a multimedia module 140, an input/output module 160, a sensor module 170, a storage 175, and a power supply 180. An artisan should understand and appreciate that the aforementioned modules include hardware do not constitute software per se. The sub-range communication module 130 includes a transmitter, receiver or transceiver that performs wireless communication for at least one of wireless local area network (WLAN) module 131 and a short-range communication module 132, and the multimedia module 140 includes at least a transmitter that performs broadcasting for at least one of a broadcast communication module 141. An audio playback module 142 has an audio processor and codec, and a video playback module 143 includes a video processor and codec. The input/output module 160 may include at least one of a button 161, a microphone 162, a speaker 163, a vibrating motor 164, the connector 165, and a keypad 166.

The controller 110, which comprises a processor or microprocessor, may control the mobile communication module 120, the sub-communication module 130, the multimedia module 140, the input/output module 160, the sensor module 170, the storage 175, the power supply 180, the touch screen 190, and the touch screen controller 195.

The controller 110 can be configured as a central processing unit (CPU) and perform a screen control operation to move media objects according to navigational inputs using the 3D computer graphics user interface.

Specifically, where there is a user input to search for a plurality of data files stored in advance, the controller 110 configures a media object display screen to be represented with images associated with the data files. In this regard, the controller 110 may create animations, visual effects, and the like for rendering the plurality of media objects onto the display screen.

For example, while displaying a media object associated with a music file, the controller 110 may also output additional information about the music file and visual effects of a rotating disc. The additional information about the music file includes an album title, a song title, play time, an artist name, and the like. If any of the media objects is selected, the controller 110 performs reproduction related to the selected media object. Such a media object display screen will be described in more detail hereinafter.

The mobile communication module 120 communicatively connects the mobile terminal 100 to an external device through mobile communication using at least one or more-antennas under control of the controller 110. The mobile communication module 120 transmits/receives wireless signals for voice calls, video conference calls, short message service (SMS) messages, or multimedia message service (MMS) messages to/from a cell phone (not shown), a smart phone (not shown), a tablet PC (not shown), or another device (not shown), the phones having phone numbers for entry into the mobile terminal 100.

The sub-communication module 130 may include at least one of the WLAN module 131 and the short-range communication module 132. For example, the sub-communication module 130 may include either the WLAN module 131 or the-short range communication module 132, or both.

The WLAN module 131 may be connected to the Internet via an access point (AP) (not shown), under control of the controller 110. The WLAN module 131 supports IEEE's WLAN standard IEEE802.11x. The short range communication module 132 may conduct short range communication between the mobile terminal 100 and an image rendering device (not shown) under control of the controller 110. The short range module may include Bluetooth, infrared data association (IrDA), etc. For example, when connected to a peripheral device via the WLAN module 131 and the short range communication module 132, the mobile terminal 100 can periodically monitor the connection state with the peripheral device. Depending on the monitoring results, the connection state can be updated and stored in the storage 175.

The mobile terminal 100 can have various other configurations and the present invention is not limited to the example shown in FIG. 1. For example, the mobile terminal can include at least one of the mobile communication module 120, the WLAN module 131 and the short range communication module 132 depending on the performance. For example, the mobile terminal 100 can include a combination of the mobile communication module 120, the WLAN module 131 and the short range communication module 132 depending on the performance.

The multimedia module 140 can include one or more of the broadcast communication module 141, the audio playback module 142, or the video playback module 143. The broadcast communication module 141 can receive broadcast signals (e.g., television broadcast signals, radio broadcast signals, or data broadcast signals) and additional broadcast information (e.g., electric program guide (EPG) or electric service guide (ESG)) transmitted from a broadcasting station through a broadcast communication antenna (not shown) under control of the controller 110. The audio playback module 142 can play digital audio files (e.g., files having extensions including but in no way limited to, for example, mp3, wma, ogg, or wav) stored or received under control of the controller 110. For example, where a media object is selected, the audio playback module 142 can play songs that correspond to the selected media object.

The video playback module 143 may play digital video files (e.g., files having extensions, including but in no way limited to, for example such as mpeg, mpg, mp4, avi, move, or mkv) stored or received under control of the controller 110. In an embodiment, where media objects are video files, respective thumbnail images for the video files are played on the media object display screen and the video playback module 143 plays a selected video file.

The multimedia module 140 is not limited to what is shown in FIG. 1 and can include the both the audio playback module 142 and the video playback module 143 without the broadcast communication module 141. The audio playback module 142 or video playback module 143 of the multimedia module 140 can be incorporated in the controller 100.

The input/output module 160 can include one or more of: at least one of a plurality of buttons 161, the microphone 162, the speaker 163, the vibrating motor 164, the connector 165, and the keypad 166.

The button 161 can be arranged on the front, side, or rear of a housing of the mobile terminal 100. The button 161 may include at least one of home, menu, back, volume, and power/lock buttons.

The microphone 162 generates electric signals from voice or sound received, under control of the controller 110.

The speaker 163 can output sounds corresponding to various signals (e.g., radio signals, broadcast signals, digital audio files, digital video files or photography signals) from the mobile communication module 120, sub-communication module 130, or multimedia module 140 to the outside under control of the controller 110. The speaker 163 can output sounds (e.g., button-press sounds or ringback tones) that correspond to functions performed by the mobile terminal 100. There can be one or multiple speakers 163 arranged in a proper position or proper positions of the housing of the mobile terminal 100.

In particular, in an exemplary embodiment wherein a plurality of media objects are displayed on the screen and one of them is moved to substantially the center of the screen, the media object displayed in the center can be played and the speaker 163 outputs the playing sounds. The playing sound of the media object can be output as soon as the media object is moved to the center of the screen. In this case, whenever a media object is moved to the center of the screen, playing sounds of the media object can be output. Thus, the user can listen to a song in an album while viewing the album jacket image only with a touch and drag input without pressing a separate play button every time, which is more efficient and convenient in finding a desired album.

The vibrating motor 164 may convert an electric signal to a mechanical vibration under control of the controller 110. For example, when operating the mobile terminal 100 in a vibrating mode, the vibrating motor 164 is activated when receiving a voice call from another device (not shown). There may be one or more vibration motors 164 inside the housing of the mobile terminal 100. The vibration motor 164 may operate in response to a touch activity or successive touches by a user on the touchscreen 190.

The connector 165 may be used as an interface for connecting the mobile terminal 100 to the external device (not shown) or a power source (not shown). Under control of the controller 110, data stored in the storage 175 of the mobile device 100 may be transmitted to the external device via a cable connected to the connector 165, or data may be received from the external device. Power may be received from the power source via a cable connected to the connector 165 or a battery (not shown) may be charged.

The keypad 166 can receive key inputs from the user to control the mobile terminal 100. The keypad 166 can include a mechanical keypad (not shown) formed in the mobile terminal 100, or a virtual keypad (not shown) displayed on the touchscreen 190. The mechanical keypad formed in the terminal device 100 can be excluded depending on the performance or structure of the mobile terminal 100. This keypad 166 includes a directional keypad including left and right keys to enable the user to browse a plurality of media objects. Besides, volume keys for up/down adjustment may be used as browsing keys as well.

The sensor module 170 includes at least one sensor for detecting a status of the mobile terminal 100 relative to an exterior. For example, the sensor module 170 may include a proximity sensor for detecting whether a user is approaching to the mobile device 100, a geomagnetic sensor for detecting the tilt of the mobile terminal 100, and a motion sensor for detecting the motion of the mobile terminal 100. In an exemplary embodiment of the present invention, the moving the media objects may be implemented based on the direction in which the mobile terminal 100 is tilted, which is sensed by the sensor module 170. For example, if the user tilts the mobile terminal 100 toward the right, media objects piled up on the left of a media object located in the center of the screen may be displayed while being sequentially moved to the right.

The storage 175 can store signals or data input/output according to operations of the mobile communication module 120, the sub-communication module 130, the multimedia module 140, the input/output module 160, the sensor module 170, the touchscreen 190 under control of the controller 110. The storage 175, is a non-transitory machine readable medium may store control programs and applications for controlling the mobile terminal 100 or the controller 110.

The term "storage" implies not only the storage 175, but also includes ROMs, RAMs, cache in the controller 110, or a memory card (not shown) (e.g., an SD card, a memory stick) installed in the mobile terminal 100. The storage may also include a non-volatile memory, volatile memory, hard disc drive (HDD), or solid state drive (SSD).

The power supply 180 can supply power to one or more batteries (not shown) placed inside the housing of the mobile terminal 100, under control of the controller 110. The one or more batteries power the terminal device 100. The power supply 180 can supply the mobile terminal 100 with the power input from the external power source (not shown) via a cable connected to the connector 165.

The touchscreen 190 provides a user interface for various services (e.g., call, data transmission, broadcasting, photography services). In an exemplary embodiment of the present invention, the touchscreen 190 outputs the media object display screen and outputs the media objects being moved on the screen in response to a navigational input. If there is not a touch panel equipped in the mobile terminal 100, the touchscreen 190 may instead be referred to as a 'display unit'. Moreover, the touchscreen is not required to actually detect touch, for example, near-touch coming with a predetermined distance of the touchscreen can be considered to be a touch. Also, the input unit can detect a gesture other than touch.

The touchscreen 190 can send an analog signal corresponding to at least one touch input to the user interface to the touchscreen controller 195. The touchscreen 190 may receive the at least one touch from user's physical contact (e.g., with fingers including thumb) or via a touchable input device (e.g., a stylus pen). The touchscreen 190 may receive consecutive moves of one of the at least one touch. The touchscreen 190 may send an analog signal corresponding to the consecutive moves of the input touch to the touchscreen controller 195.

Furthermore, the terms "touch" and "touches" in the present invention are not limited to physical touches by a physical contact of the user or contact with the touchable input such as a touch screen, but may also include touchless (e.g., keeping a detectable distance less than 1 mm between the touch screen 190 and the user's body or touchable input means). The detectable distance from the touchscreen 190 may vary depending on the performance or structure of the mobile terminal 100, and in particular, the touchscreen 190 can output different values (e.g., current values) for touch detection and hovering detection to distinguishably detect a touch event occurred by a contact with the user's body or stylus or the touchable input and a contactless input (e.g., a hovering event). Furthermore, the touchscreen 190 may output different values (e.g., current values) for hovering detection over distance between where the hovering event occurs and the touchscreen 190. In addition, gesturing can be used to input some commands.

The touchscreen 190 may be implemented in e.g., a resistive way, capacitive way, infrared way, or acoustic wave way.

The touchscreen controller 195 converts the analog signal received from the touchscreen 190 to a digital signal (e.g., XY coordinates) and transmits the digital signal to the controller 110. The controller 110, which may be considered to be a main controller, can control the touchscreen 190 by using the digital signal received from the touchscreen controller 195. For example, the controller 110 can enable a media object displayed on the touchscreen 190 to be selected in response to a touch, and with a drag input after the touch, sequentially move the plurality of media objects along a predetermined course.

A method of navigating the plurality of media objects in the mobile terminal 100 will now be described below with reference to FIG. 2. However, it should be noted that the mobile terminal 100 of the present invention is not limited to what is described herein below and is applicable to many different exemplary embodiments based on the following embodiments.

First, an exemplary case where media objects are related to music album files will be discussed herein below. The media objects are represented as respective album jacket images, each album having a group of songs. Thus, when a media object is selected (by the user), the mobile terminal 100 displays the media object with a song list of an album related to the media object for the user to view the song list, and simultaneously play songs of the album.

Figure 2:
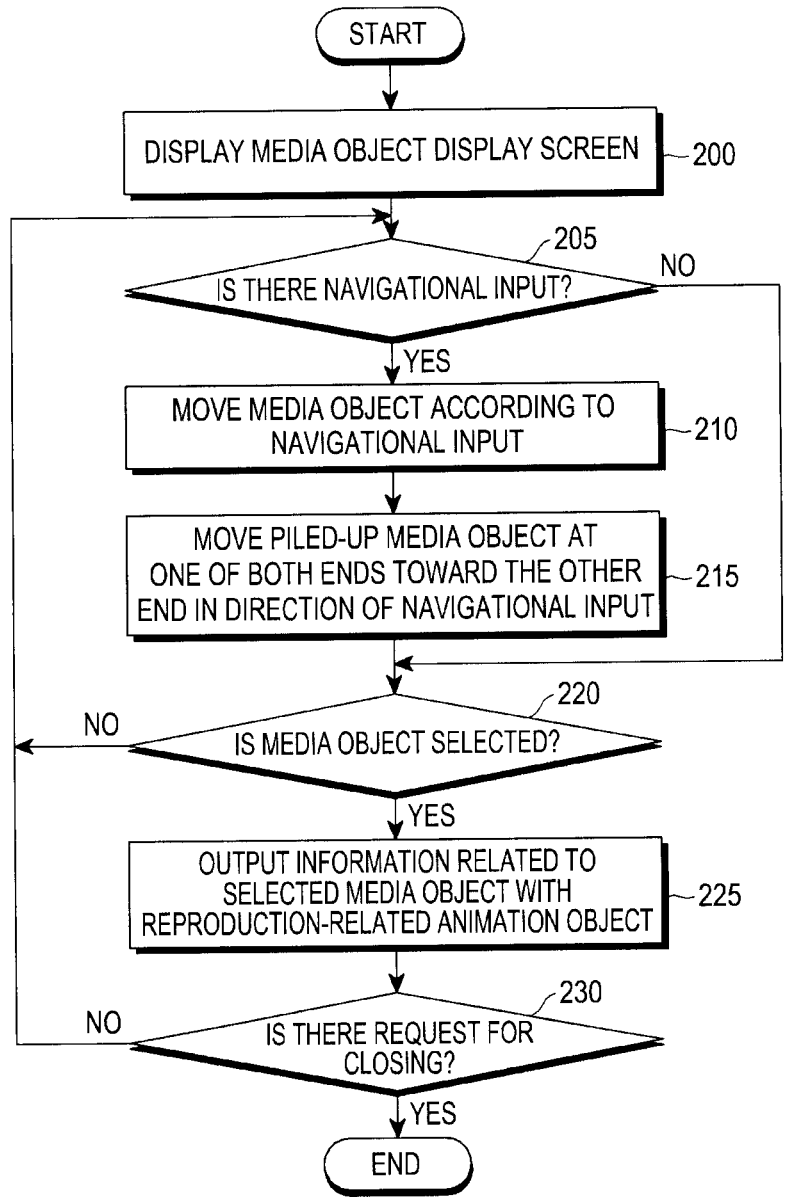
FIG. 2 is a flowchart illustrating exemplary operations of the mobile terminal, according to an exemplary embodiment of the present invention.
Figure 3:
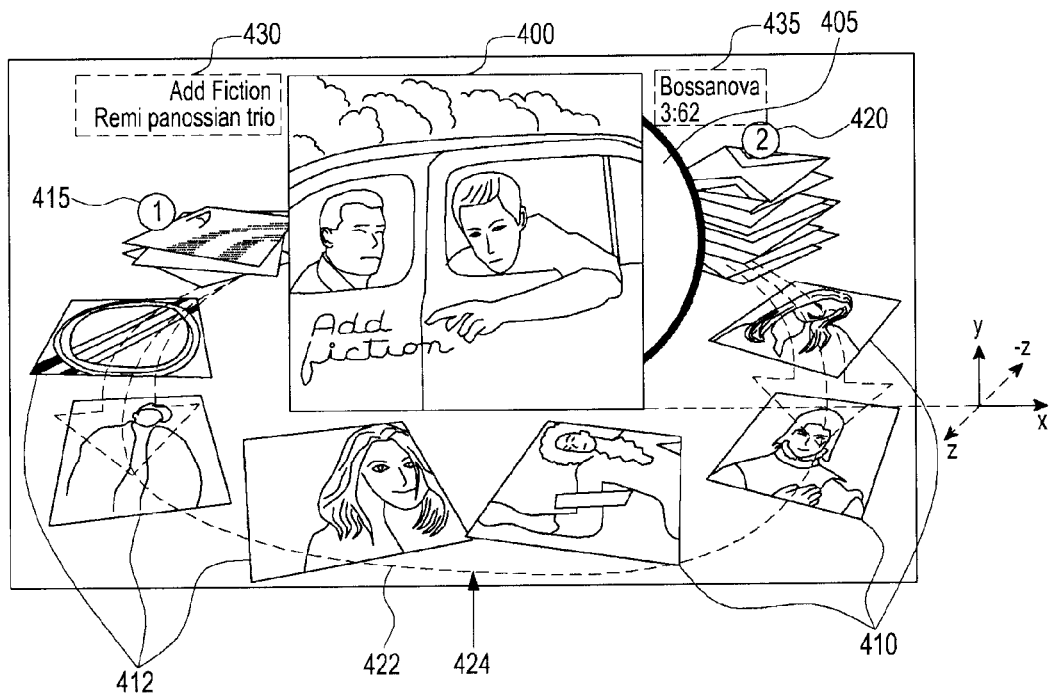
FIG. 3 illustrates an exemplary screen in which a plurality of media objects are displayed, according to an exemplary embodiment of the present invention.
Figure 4:
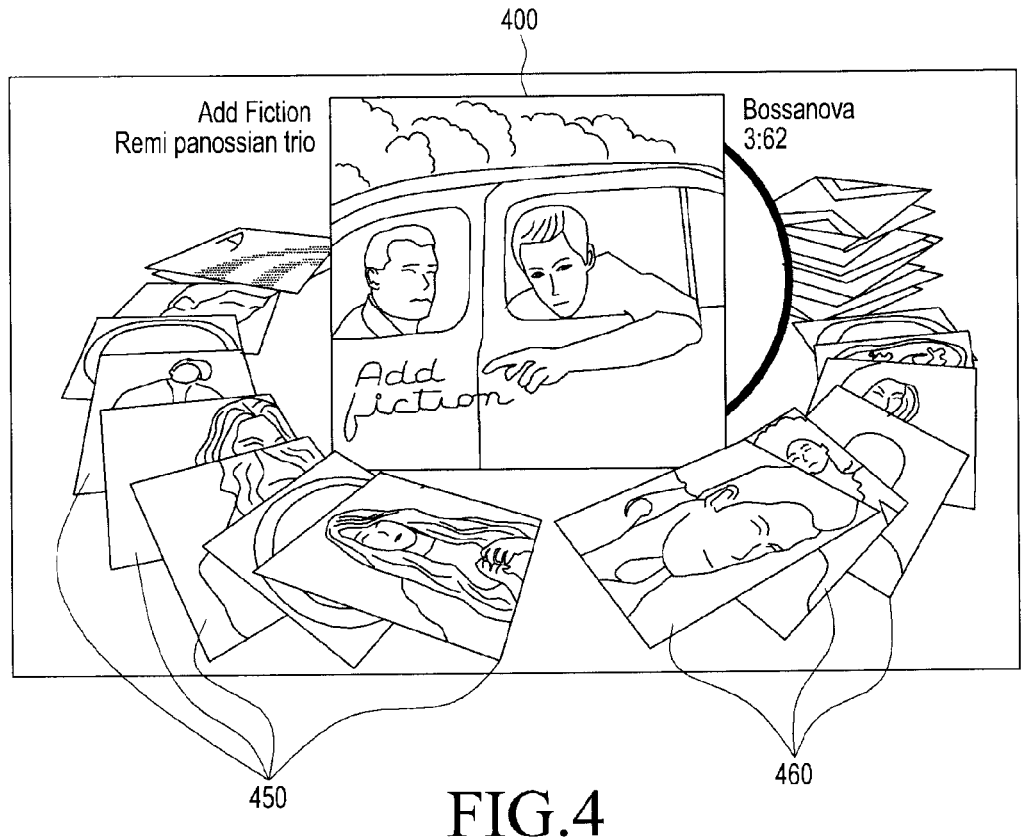
FIG. 4 illustrates an exemplary screen in which a plurality of media objects are displayed, according to another exemplary embodiment of the present invention.
Figure 5:
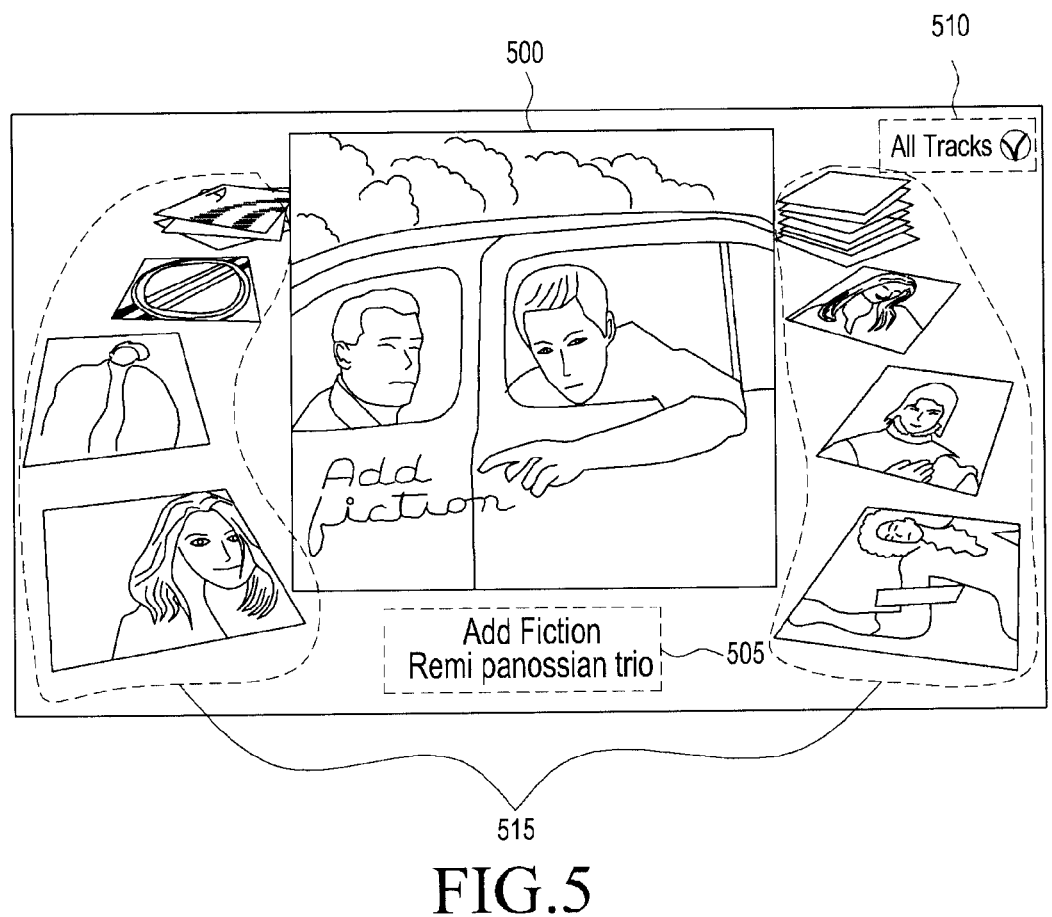
FIG. 5 illustrates an exemplary screen in which a plurality of media objects are displayed, according to another exemplary embodiment of the present invention.

FIG. 2 is a flowchart of exemplary operations of the mobile terminal, according to an exemplary embodiment of the present invention, FIG. 3 illustrates a screen in which a plurality of media objects are displayed, according to an exemplary embodiment of the present invention, FIG. 4 illustrates a screen in which a plurality of media objects are displayed, according to another exemplary embodiment of the present invention, and FIG. 5 illustrates a screen in which a plurality of media objects are displayed, according to yet another exemplary embodiment of the present invention.

Referring now to FIG. 2, in step S200 the mobile terminal 100 displays the media object display screen upon request of the user.

As shown in FIG. 3, the media object display screen displays some piled-up media objects at each of first and second positions 415 and 420 and some other media objects 410 and 412 arranged along a substantially curved course that connects the first position 415 and the second position 420. A media object 400 can be displayed in the center of the media object display screen as soon as the mobile terminal 100 displays the media object display screen or otherwise, the media object can be displayed when a media object that corresponds to the media object 400 is selected from among the media objects 410 and 412 arranged along the substantially curved course.

The media object 400 is displayed to look forward, and the media objects 410 and 412 on the curved course 422 are displayed in a tilted state not to overlap with one another.

Thus, the user is able to view spread-out media objects on the curved course 422 in advance, thus searching files more quickly than with conventional portable terminals.

To give a sense of perspective, some of the media objects spread along the curved course 422 are clearly displayed when they are located in the middle 424 of the curved course 422 and get less clear and/or somewhat smaller in size as they are farther away from the middle 424.

For example, where the media object 400 in the center is assumed to be on a substantially central position in a space represented in three axes X, Y, and Z, the forward and backward direction of the media object 400 may be referred to as the depth direction. In this case, media objects having shallower depths from the media object 400 are displayed more clearly while media objects having deeper depths from the media object 400 are displayed less clearly.

In other words, media objects arranged farther from behind the media object 400 are displayed less clear while media objects arranged nearer to the front of the media object 400 are displayed relatively clearer than those arranged behind the media object 400.

To implement this method, the controller 100 can perform rendering that reflects an extent of unclarity on a corresponding media object based on depth information of the media object, in displaying the plurality of media objects on the media object display screen. As for displaying the size of the media object, the nearer to the middle of the curved course the media object is placed, e.g., the shallower the depth of the media object is, and the larger is a size of the media object being displayed; the farther from the middle of the curved course the media object is placed, e.g., the deeper the depth of the media object is, the smaller is a size of the media object being displayed.

In the meantime, unlike the connection with FIG. 3, media objects can be arranged along the curved course while being partially overlapped with one another with the media object 400 being in the center, according to another exemplary embodiment of the present invention, as shown in FIG. 4. In this case, the media object 400 located substantially in the center and some of the other media objects 450 and 460 are arranged to face forward.

FIG. 5 illustrates the media object display screen, according to yet another exemplary embodiment of the present invention. In FIG. 5, a selected media object 500 is located substantially in the center of the screen and additional information of the media object 500, e.g., a song title, is placed in an area 505 below the media object 500. In this example, the rest of media objects 515 are arranged on both sides of the media object 500 in the center. Unlike the example shown in FIG. 3 where some media objects are arranged even in front of the media object in the center, thus forming almost a closed curve, in FIG. 5, to increase visual recognizability of a selected media object, the selected media object is arranged in the center with some of the other media objects arranged on both sides of the center in the backward direction. In the area 505 below the media object 500, the album title and a song title is displayed, but all track information of the album may be arranged in a hidden form in a separate display area 510.

With reference to the flowchart of FIG. 2, at S205 where a navigational input occurs, then at S210 the mobile terminal 100 moves media objects according to the navigational input.

At S215, the screen displays the piled-up media objects at one end to be moved toward the other end in the navigational direction. Otherwise, if no navigational input is made in S205, the process proceeds to S220.

At S205, the navigational input refers to an input made by any of touch events on the touchscreen 190, pen hovering events, directional input events with the keypad 166 or the button 161, motion events of the mobile terminal 100.

For example, if the navigational input is made by a touch event, media objects are displayed to be moved one by one in a dragging direction after the touch. Otherwise, if the navigational input is made by a motion event, media objects are displayed to be moved in a direction in which the mobile terminal is tilted. Also, if the navigational input is made by a directional input event, media objects are displayed to be moved in a direction that corresponds to the up, down, left, or right button or key.

In this regard, referring to FIG. 3, when the navigational input is a right directional input, a media object at the top of the piled-up media objects at the first position 415 is first moved along the curved course and may end up being placed at the bottom of the piled-up media objects at the second position 420. On the contrary, when the navigational input is a left direction input, a media object at the top of the piled-up media objects at the second position 420 is first moved along the curved course and may end up being placed at the bottom of the piled-up media objects at the first position 415. This stereoscopic rotational manner of displaying media objects, in which the media objects are moved sequentially one by one, gives the user more convenient and realistic user interfacing, and provides a faster way to search.

Referring back to FIG. 2, at S220, when a media object is selected, then at S225 the mobile terminal 100 outputs information related to the media object as well as a reproduction-related animation object. The reproduction-related animation object is what results from animation of operations of taking out a disc object 405 having a disc shape from the selected media object and rotating the disc object 405.

In a case where no media object should be displayed at the center, if a media object on the curved course is selected, the mobile terminal 100 can expand and display the selected media object in an area between the first position 415 and the second position 420.

The foregoing process is repeated until at S230 a request to close the media object display screen is made. As illustrated in FIGS. 3 to 5, the information 430, 435, 505, and 510 related to the selected media object may include at least one of an album title of the album file, an artist name, a played song title, play time, and/or the like, just to name some non-limiting examples. Additionally, as any of the media objects is selected, operations related to the media object can then be performed. For example, if the user selects an album jacket image, the mobile device 100 may play songs contained in the album or display a list of songs in the album.

Figure 6:
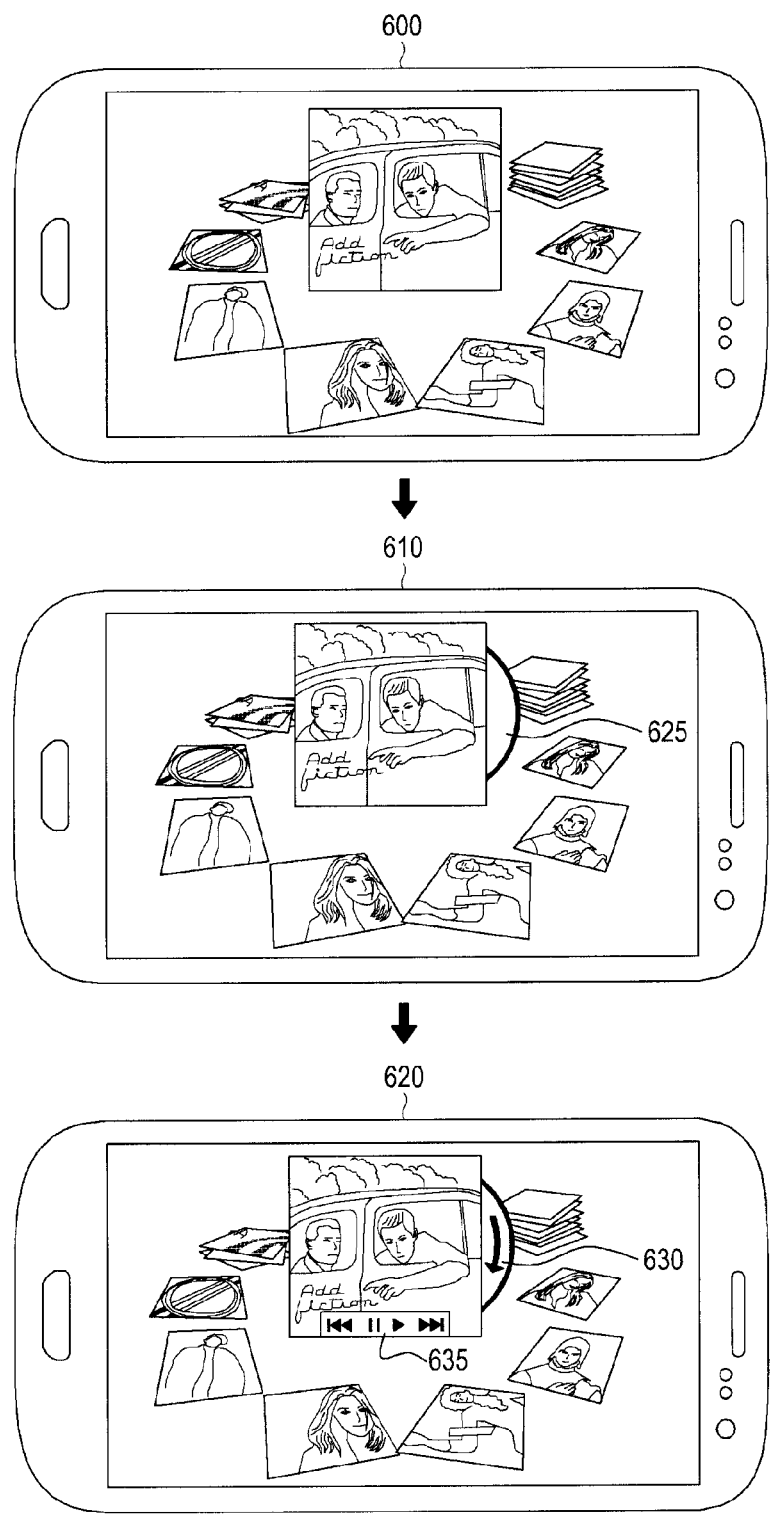
FIG. 6 illustrates playing exemplary screens in the process of selecting a media object, according to an exemplary embodiment of the present invention.

In the foregoing, a media object-related reproduction is performed when a media object is selected; however, alternatively, whenever a navigational input is made, a media object to be displayed in the middle area between the first position 415 and the second position 420 is shifted and reproduction related to a media object placed in the middle area is performed immediately, FIG. 6 illustrates playing screens in the process of selecting a media object, according to an exemplary embodiment of the present invention.

First, in the first screen 600, a plurality of media objects are displayed to be sequentially moved one-by-one in response to navigational inputs and a media object placed in the middle of the curved course is displayed in the center of the screen.

In the second screen 610, an animation of taking out a disc object 625 from the media object displayed in the center of the screen is displayed.

Next, in the third screen 620, rotating disc object 630 after being taken out may be displayed. In other words, in the third screen 620, an animation of rotating the disc object 630 may be displayed. At this time, a reproduction-related button image 635 may be superimposed on the media object in the center while the media object is reproduced.

Figure 7:
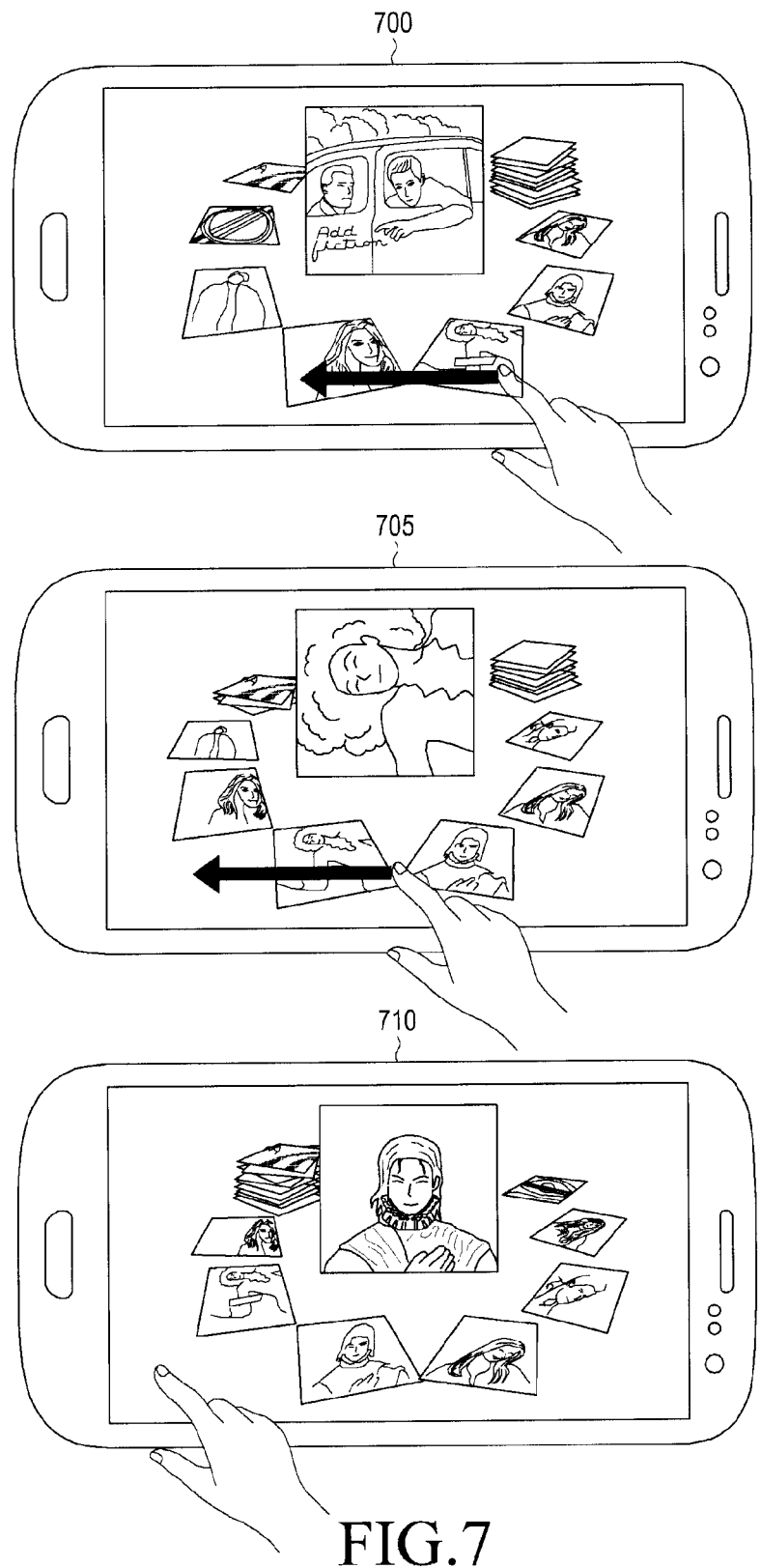
FIG. 7 illustrates exemplary screens in which media objects are shifted in response to input events, according to an exemplary embodiment of the present invention.

FIG. 7 illustrates a screen in which media objects are moving along the substantially curved course in response to the navigational input. For example, if the input event is a touch event, the media object display screen may be displayed in which media objects are moving from one of the first and second positions to the other in a dragging direction based on the touch event.

Specifically, in the first screen 700, if the user drags the screen 700 with a user input means, e.g., a finger from right to left, the first screen 700 is changed to the second screen 705 to the third screen 710, as the items are moving along the curve in a clockwise direction. Whenever a dragging input is made, a media object to be displayed in the center is changed in sequence, and in this regard, the number of media objects to be sequentially displayed in the center may depend on the dragging time or the dragging distance. If the user drags long while holding the touch input, the screen may be displayed such that media objects therein are quickly moving along the course.

Whenever the navigational input is made, media objects piled up on the right of the media object displayed in the larger size of the center, which corresponds to one located where the touch input occurs are moved to the left and piled up at the left end, as shown in the first to third screens 700, 705, and 710. Although, in FIG. 7, media objects are moved along the curved course one-by-one in response to the navigational input, a course connecting the first position and the second position is not limited to the curved form. For example, the course may be curved, straight, circular, or oval, and, of course, may be implemented as a closed curve that connects the first position and the second position. As such, the user is able to move media objects by touching and dragging in a desired direction with his/her finger, thus easily and simply searching for a desired media object even if there are enormous amounts of media objects.

Figure 8:
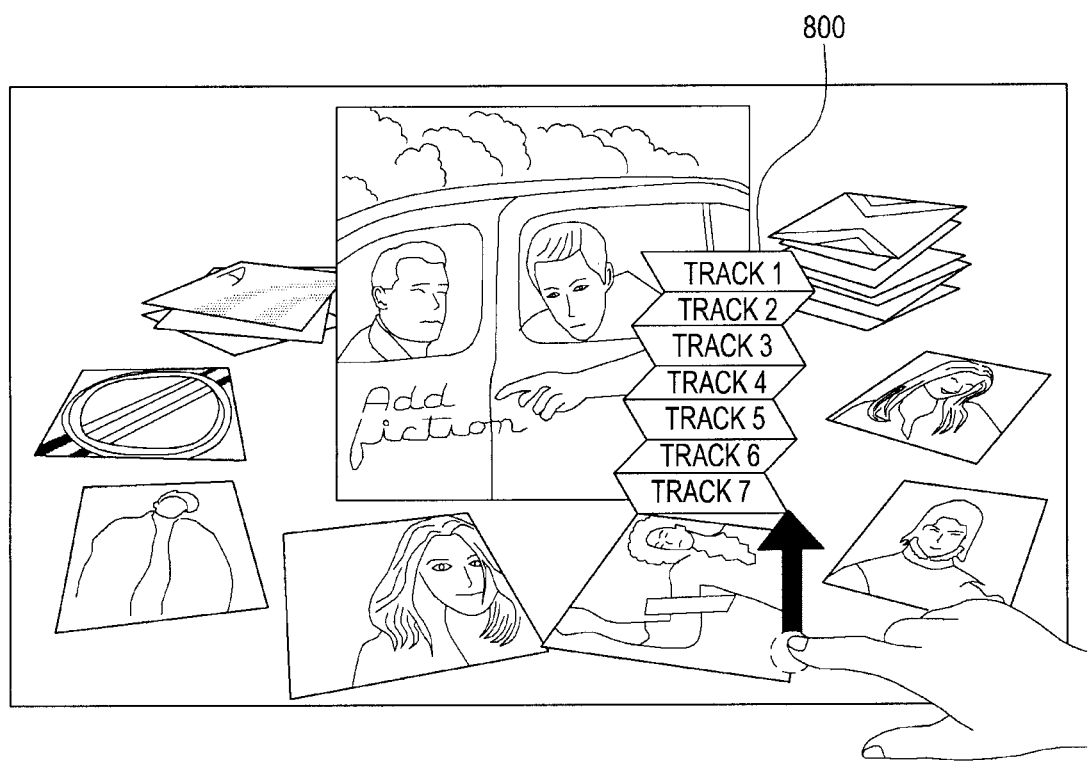
FIG. 8 illustrates an exemplary screen in which a detailed list is displayed of what are contained in a media object, according to an exemplary embodiment of the present invention.

FIG. 8 illustrates a screen in which a detailed list of what are contained in a media object is displayed, according to an embodiment of the present invention.

In this exemplary embodiment, if the media object corresponds to an album file, the album file may contain a group of songs. Taking the aforementioned into account, if a media object is selected from among media objects arranged along the course, as shown in FIG. 8, the mobile terminal 100 may display a detailed list 800 with respect to the media object. In this particular example, the detailed list may be a list of songs (tracks) contained in the album file that corresponds to the selected media object. In this case, the user may easily identify songs that belong to the album file.

According to the present invention, visual recognizability of media objects of the mobile terminal is enhanced and thus, the user can quickly recognize the amount of media objects as well as where the current media object is located.

Also, displaying media objects arranged along the moving course to look forward may help to efficiently use the limited screen and enable the user to easily check the content of the media object.

Furthermore, the present invention gives the user more intuitive and sensual experience by providing visual effects as if a real disc were rotating and playing when a media object is selected.

The above-described methods according to the present invention can be implemented in hardware, firmware or as software or computer code that is stored on a non-transitory machine readable medium such as a CD ROM, a RAM, a floppy disk, a hard disk, or a magneto-optical disk or computer code downloaded over a network originally stored on a remote recording medium or a non-transitory machine readable medium and stored on a local non-transitory recording medium, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor" or "microprocessor" constitute hardware in the claimed invention. Under the broadest reasonable interpretation, the appended claims constitute statutory subject matter in compliance with 35 U.S.C. §101 and none of the elements consist of software per se. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

The terms "unit" or "module" as may be used herein is to be understood as constituting hardware such as a processor or microprocessor configured for a certain desired functionality in accordance with statutory subject matter under 35 U.S.C. §101 and does not constitute software per se.

The software can be stored as program instructions or computer readable codes on a computer-readable medium that is loaded into and executed by hardware such as a processor or microprocessor. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor. The memory included in the power transmitter or the power receiver may be an example of the computer readable recording medium suitable for storing machine executable code that is loaded into and executed by a processor(s) or microprocessor(s) to implement the exemplary embodiments of the present invention.

The mobile terminal can receive and store the program in a machine readable storage medium from a program provider wiredly/wirelessly connected thereto. The program includes machine executable code that is loaded into and executed by hardware such as a processor for the mobile terminal to perform the screen display method such as the in the examples discussed hereinabove, a memory for storing information required for the method, a communication unit for wiredly/wirelessly communicating with the mobile terminal, and a controller for receiving a request from the mobile terminal and delivering corresponding programs to the mobile terminal.

Several exemplary embodiments have been illustrated and described, but it will be understood that various modifications can be made without departing from the spirit of the invention and the scope of the appended claims. Those of ordinary skill in the art should understand and appreciate that the invention is not limited to the exemplary embodiments shown and described herein, but can encompass not only the appended claims but the equivalents.

What is claimed is:

1. A screen display method in a mobile terminal, the method comprising:
    displaying a plurality of media objects to be piled-up at first or second positions and in which a first pile contains the plurality of the media objects available to display in a stack in the first position and in which the stack is reduced in size as respective media objects move to the second position to form a second pile, and in which some of the plurality of media objects are arranged in a non-stacked manner along a course connecting the first and second positions; and
    displaying the piled-up media objects that are movable from one of the first and second positions along the course toward the other of the first and second positions in response to an input event.

2. The screen display method of claim 1, wherein the piled up objects are sequentially movable along the course toward the other of the first and second positions in response to the input event.

3. The screen display method of claim 1, wherein the media objects are related to any of music files, album files each having a group of music files, photo files, or video files.

4. The screen display method of claim 3, wherein a related group of music files, photo files or video files move as a group from one of the first and second positions toward the other of the first and second positions in response to the input event.

5. The screen display method of claim 1, further comprising:
    displaying at least some of the plurality of media objects that move along the course in response to the input event are arranged in a middle area between the first and second positions.

6. The screen display method of claim 5, wherein displaying any one of the media objects arranged along the course as they move into the middle area between the first and second positions comprises:
    determining whether a media object of the plurality of media objects is selected from among the media objects arranged along the course; and
    expanding a size and displaying the media object in the middle area between the first and second positions differently after the media object is selected.

7. The screen display method of claim 5, wherein a selected media object is displayed to face forward, and the media objects between the first and second positions are displayed in a tilted state not to overlap with one another.

8. The screen display method of claim 5, further comprising:
    reproducing a media object of the plurality of media objects when the media object is placed in the middle area along the course between the first and second positions.

9. The screen display method of claim 8, further comprising:
    displaying a reproduction-related button image that is superimposed on the media object is being reproduced.

10. The screen display method of claim 5, further comprising:
    in response to determining a selected media object is related to an album file having a group of a plurality of music files, displaying a disc object having a disc shape that is shown as extending from the selected media object and displays a rotating motion while the selected media object is accessed.

11. The screen display method of claim 10, wherein displaying at least any of the plurality of media objects movable along the course into a middle area between the first and second positions comprises,
    displaying the at least any of the media objects as an album jacket image with additional information about the album file.

12. The screen display method of claim 1, wherein the media objects arranged along the course between the first and second positions are displayed with a sense of perspective by reducing clarity of the media objects when arranged further from a center of the course.

13. The screen display method of claim 1, wherein the input event comprises any of: touch events on a touchscreen of the mobile terminal, pen hovering events, directional keypad input events, and motion events of the mobile terminal.

14. The screen display method of claim 13, wherein displaying the piled-up media objects at one of the first and second positions movable along the course toward the other of the first and second positions when an input event occurs comprises,
    in response to the input event being a touch event,
    displaying the media objects that are movable from one of the first and second positions toward the other of the first and second positions in a dragging direction based on the touch event.

15. The screen display method of claim 1, further comprising:
    in response to a media object is selected from among the media objects displayed that are movable along the course, displaying a detailed list of what is contained in the selected media object.

16. The screen display method of claim 15, wherein the detailed list comprises a list of songs contained in an album file having a group of the songs, in accordance with the selected media object being related to the album file.

17. A mobile terminal for displaying a screen, the mobile terminal comprising:
    an input unit configured to receive an input event;
    a storage configured to store a plurality of media objects; and
    a processor configured to, control a display of media objects to be piled-up at first and second positions in which a first pile contains the plurality of the media objects available to display in a stack in a first position and in which the stack is reduced in size as respective media objects move to the second position to form a second pile, and to control the display of media objects to be arranged in a non-stacked manner along a course connecting the first and second positions; and control the display of the piled-up media objects at one of the first and second positions that are movable along the course toward the other of the first and second positions in response to an input event.

18. The mobile terminal of claim 17, wherein the input event comprises an input gesture.

19. The mobile terminal of claim 17, wherein the input unit comprises a touch screen, and the input occurs by touch or near-touch within a predetermined distance of the input unit.

20. The mobile terminal of claim 18, wherein the media objects are related to any of music files, album files each having a group of music files, photo files, and video files.

21. The mobile terminal of claim 19, wherein the media objects are related to any of music files, album files each having a group of music files, photo files, and video files.

22. The mobile terminal of claim 17, wherein the processor controls the display of any of the media objects arranged along the course that are movable into a middle area between the first and second positions.

23. The mobile terminal of claim 22, wherein the processor controls the display of a media object in the middle area of the screen to be shifted in response to the input event.

24. The mobile terminal of claim 22, wherein the processor controls expanding a size of and displaying a media object selected from among the media objects arranged along the course in the middle area of the screen between the first and second positions.

25. The mobile terminal of claim 17, wherein a selected media object is displayed to face forward, and the media objects are displayed between the first and second positions in a tilted state not to overlap with one another.

26. The mobile terminal of claim 22, wherein the processor reproduces the media objects in response to the media object being placed in the middle area between the first and second positions.

27. The mobile terminal of claim 26, wherein the processor controls the display of a reproduction-related button image that is superimposed on the media object while being reproduced.

28. The mobile terminal of claim 26, wherein in accordance with the any of the media objects being related to an album file having a group of a plurality of music files, the processor controls the display of a disc object having a disc shape that extends from a selected media object and is rotates while the media object is reproduced.

29. The mobile terminal of claim 28, wherein the any of the media objects are displayed as an album jacket image with additional information about the album file.

30. The mobile terminal of claim 17, wherein the media objects arranged along the course that between the first and second positions are displayed with less clarity as they are further from a middle of the course.

31. The mobile terminal of claim 17, wherein in accordance with a media object being selected from among the media objects displayed that are movable along the course, the processor controls the display of a detailed list of what is contained in the selected media object.

32. The mobile terminal of claim 31, wherein the detailed list comprises a list of songs contained in an album file having a group of the songs, when the selected media object is related to the album file.

33. The mobile terminal of claim 17, wherein the media objects are related to any of music files, album files each having a group of music files, photo files, and video files.

34. The mobile terminal of claim 18, wherein the media objects are related to any of music files, album files each having a group of music files, photo files, and video files.

* * * * *